United States Patent
Vaughn

(10) Patent No.: US 9,187,030 B1
(45) Date of Patent: Nov. 17, 2015

(54) AUXILIARY TRAILER LIGHTING AND CONTROL DEVICE

(71) Applicant: Robert D. Vaughn, Connersville, IN (US)

(72) Inventor: Robert D. Vaughn, Connersville, IN (US)

( * ) Notice: Subject to any disclaimer, the term of this patent is extended or adjusted under 35 U.S.C. 154(b) by 256 days.

(21) Appl. No.: 13/935,788

(22) Filed: Jul. 5, 2013

(51) Int. Cl.
*B60Q 1/26* (2006.01)

(52) U.S. Cl.
CPC ........................................ *B60Q 1/26* (2013.01)

(58) Field of Classification Search
CPC ........ B60Q 1/26; B60Q 1/2603; B60Q 1/387; B60Q 11/005; B60Q 3/0293; B60Q 3/048
USPC .......................................................... 315/77
See application file for complete search history.

(56) References Cited

U.S. PATENT DOCUMENTS

| | | | |
|---|---|---|---|
| 4,903,174 A * | 2/1990 | Busby | 362/485 |
| D362,659 S | 9/1995 | Hedding et al. | |
| 7,113,078 B2 | 9/2006 | Young | |
| 7,388,514 B1 | 6/2008 | McDow | |
| D584,695 S | 1/2009 | Hilsbos et al. | |
| 8,469,824 B1 * | 6/2013 | Farley et al. | 463/53 |
| 2006/0229034 A1 * | 10/2006 | Gizis et al. | 455/95 |
| 2014/0265840 A1 * | 9/2014 | Romberger et al. | 315/77 |

* cited by examiner

*Primary Examiner* — John Poos
*Assistant Examiner* — David Mattison
(74) *Attorney, Agent, or Firm* — Crossley Patent Law

(57) ABSTRACT

An auxiliary trailer lighting and control device that includes an ergonomically configured pistol grip distributor box disposed in direct circuit with a trailer lighting system, whereby traffic signals may be manually communicated directly to the trailer lighting system, and thus relayed to other traffic, when the extant primary lighting circuit in the trailer is malfunctioning or if the particular towing automobile lacks a trailer lighting interconnect.

6 Claims, 3 Drawing Sheets

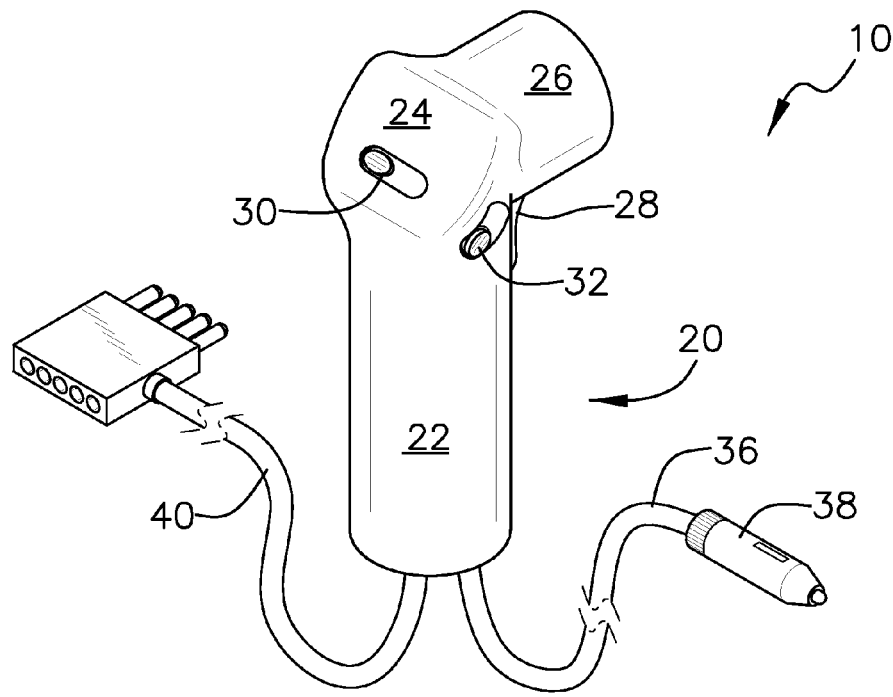
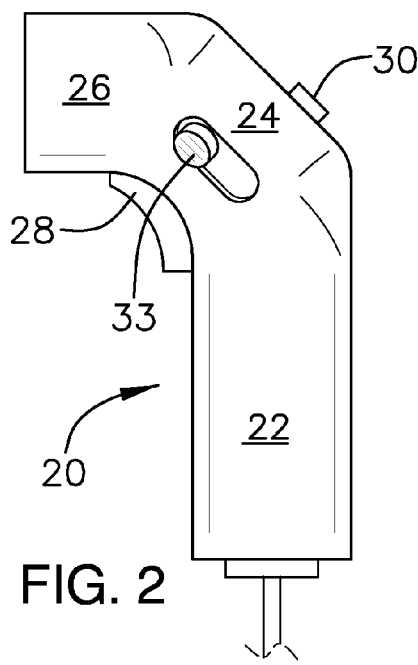
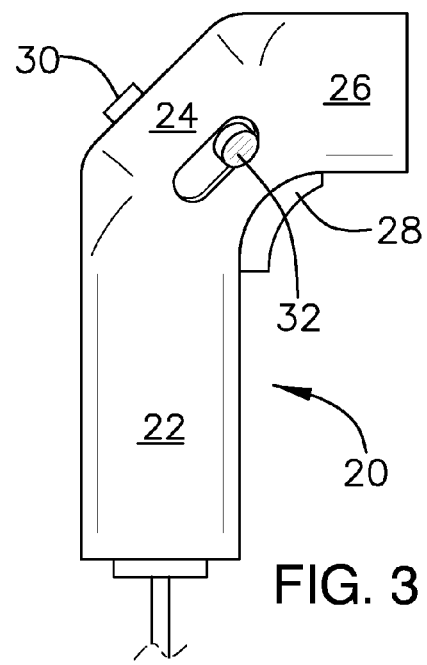

AUXILIARY TRAILER LIGHTING AND CONTROL DEVICE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of trailer lighting devices are known in the prior art. However, what is needed is an auxiliary trailer lighting and control device that includes an ergonomically configured pistol grip distributor box disposed in direct circuit with a trailer lighting system, whereby traffic signals may be manually communicated directly to the trailer lighting system, and thus relayed to other traffic, when the extant primary lighting circuit in the trailer is malfunctioning or if the particular towing automobile lacks a requisite trailer lighting interconnect.

FIELD OF THE INVENTION

The present invention relates to an auxiliary trailer lighting and control device, and more particularly, to an auxiliary trailer lighting and control device that includes an ergonomically configured pistol grip distributor box disposed in direct circuit with a trailer lighting system, whereby traffic signals may be manually communicated directly to the trailer lighting system, and thus relayed to other traffic, when the extant primary lighting circuit in the trailer is malfunctioning or if the particular towing automobile lacks a requisite trailer lighting interconnect.

SUMMARY OF THE INVENTION

The general purpose of the auxiliary trailer lighting and control device, described subsequently in greater detail, is to provide an auxiliary trailer lighting and control device which has many novel features that result in an auxiliary trailer lighting and control device which is not anticipated, rendered obvious, suggested, or even implied by prior art, either alone or in combination thereof.

The present invention has been devised to enable a driver to manually operate the lights on a trailer towed behind a vehicle in case the primary, extant lighting system in the trailer should fail or should the particular towing automobile lack the requisite trailer lighting interconnect.

The present auxiliary trailer lighting and control device includes a pistol grip distributor box ergonomically configured for manual operation at the driver's side, said pistol grip distributor box disposed in circuit with an extant trailer lighting system and powered directly from the particular automobile in which the device is installed.

The present auxiliary trailer lighting and control device, therefore, includes a pistol grip distributor box interconnected directly with an extant trailer lighting system. The pistol grip distributor box is ergonomically configured for ready and comfortable grasping by the hand of a driver, whereby a brake light trigger, a turn signal switch, a running lights switch, and a hazard light switch are conveniently operable by a relevant digit of the driver's hand.

The pistol grip distributor box includes a cylindrical vertical portion, and angled portion, and a cylindrical horizontal portion. The angled portion is disposed atop the vertical portion, and angled towards the front of the vehicle in which the device is installed. The vertical portion is perpendicularly disposed with the horizontal portion. The horizontal portion is disposed endwise upon the angled portion, and likewise faces the front of the vehicle in which the device is installed.

The brake light trigger is disposed underlying the horizontal portion for depression by an index finger of a driver when the pistol grip distributor box is grasped. The turn signal switch is disposed atop the angled section, in a position for convenient operation by the thumb of a driver grasping the pistol grip distributor box. The hazard light switch is disposed on one side of the angled section, positioned for activation by a thumb of a driver grasping the pistol grip distributor box. The running lights switch is disposed on the other side of the angled portion.

A Central Processing Unit ("CPU") is disposed within the pistol grip distributor box, the CPU disposed in operational communication with the brake light trigger switch, the turn signal switch, the running lights switch, and the hazard light switch. When the brake light trigger is depressed, the trailer brake lights are thereby illuminated. When the turn signal switch is moved to each of a first, and alternately a second position, the respective trailer turn signal is activated. When the running lights switch is activated, the trailer running lights are illuminated. When the hazard light switch is engaged, the trailer hazard lights are activated.

To power the device, and distribute power directly to the trailer lighting system, a first cord is disposed connected to the pistol grip distributor box. An automobile cigarette lighter adapter is disposed endwise upon the first cord for interconnection with an extant automobile cigarette lighter power outlet. A second cord is connected to the pistol grip distributor box for direct interconnection with the extant trailer lighting circuit.

To prevent damage rendered the circuitry, the CPU, or a discharge to a driver operating the device, a fuse is disposed in circuit between the first cord and the CPU, whereby electrical surges will cause a circuit break. The fuse is readily replaceable, as needed.

Thus, a driver may manually operate the lighting system of an extant trailer directly from the driver's seat, to communicate a relevant traffic signal on the road if and when a primary trailer lighting circuit fails to operate in conjunction with the particular automobile's lighting system, or if the towing vehicle lacks the necessary trailer lighting interconnect.

Thus has been broadly outlined the more important features of the present auxiliary trailer lighting and control device so that the detailed description thereof that follows may be better understood and in order that the present contribution to the art may be better appreciated.

Objects of the present auxiliary trailer lighting and control device, along with various novel features that characterize the invention are particularly pointed out in the claims forming a part of this disclosure. For better understanding of the auxiliary trailer lighting and control device, its operating advantages and specific objects attained by its uses, refer to the accompanying drawings and description.

BRIEF DESCRIPTION OF THE DRAWINGS

Figures

FIG. 1 is an isometric view.
FIG. 2 is a side view.
FIG. 3 is a side view.

DETAILED DESCRIPTION OF THE DRAWINGS

Figure 4:
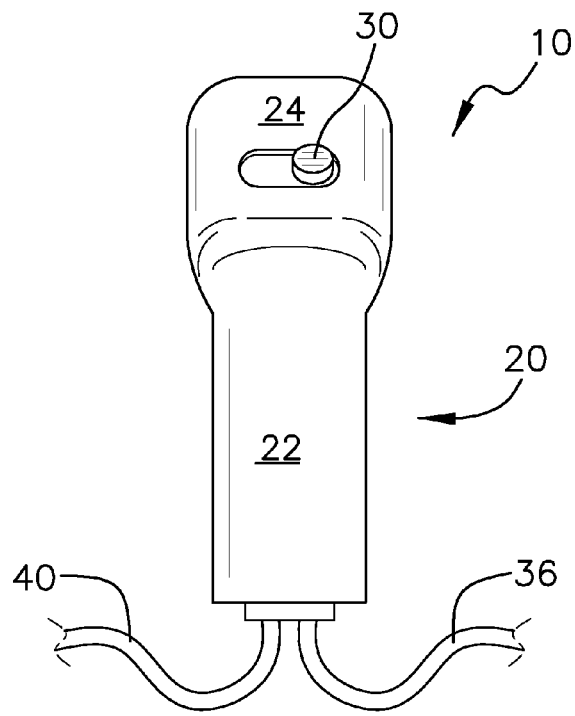
FIG. 4 is a rear view.
Figure 5:
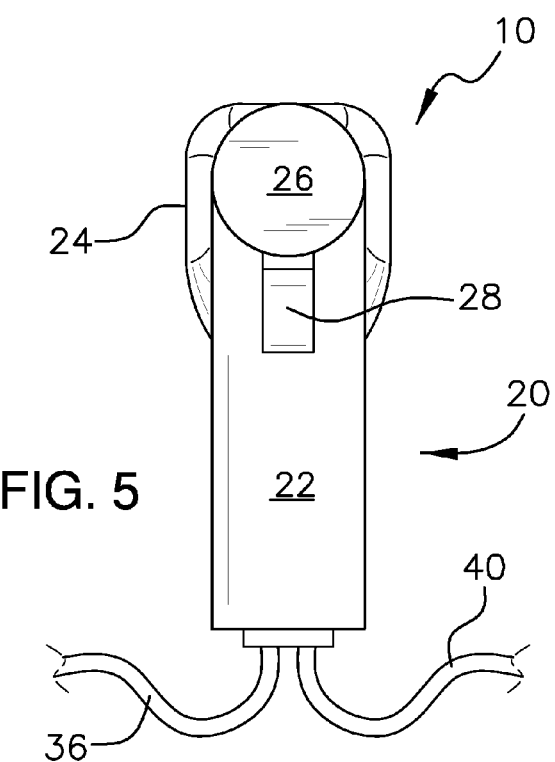
FIG. 5 is a front view.
Figure 6:
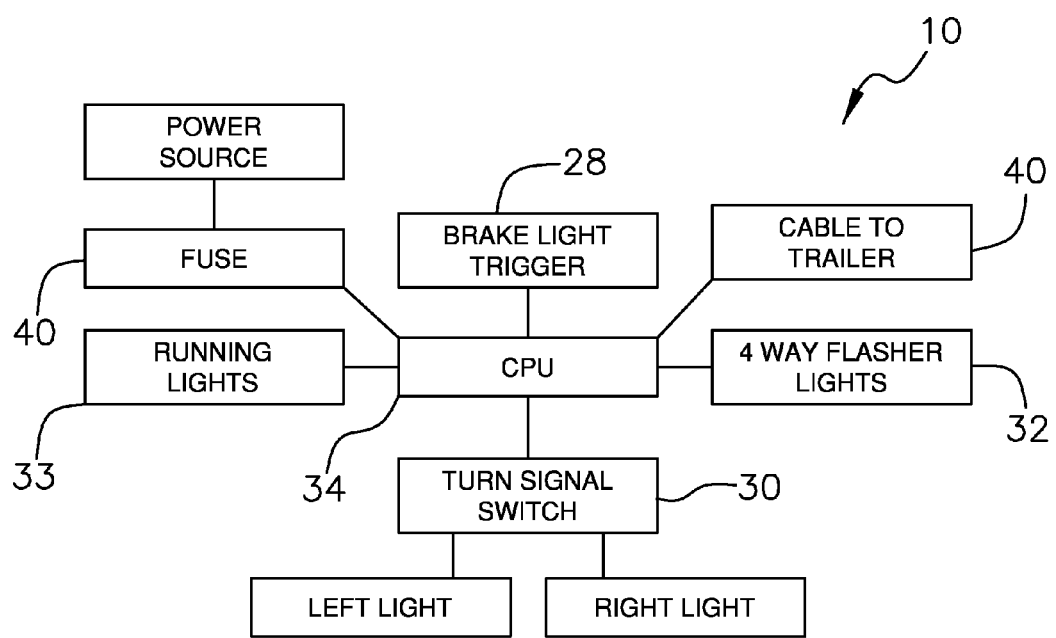
FIG. 6 is a block diagram.

With reference now to the drawings, and in particular FIGS. 1 through 6 thereof, example of the instant auxiliary trailer lighting and control device employing the principles and concepts of the present auxiliary trailer lighting and control device and generally designated by the reference number 10 will be described.

Referring to FIGS. 1 through 6 a preferred embodiment of the present auxiliary trailer lighting and control device 10 is illustrated.

When towing a trailer, the trailer lighting circuit may fail due to a short in the system, or other problem, whereby the trailer lights fail to operate in tandem with the relevant vehicle's lights when, for example, the brake is applied or a turn signal activated. Some automobiles suited or adaptable for towing do not have a requisite trailer lighting interconnect whereby the trailer lighting circuit can be interconnected with the particular automobile's lighting circuit. What is needed is an auxiliary trailer lighting and control device that enables manual operation of the trailer lights should a short in the trailer lighting system disable the circuit operating in conjunction with the towing vehicle's lights, or should a particular towing vehicle lack the requisite trailer lighting interconnect to relay traffic signals through to the trailer.

The present auxiliary trailer lighting and control device 10, therefore, includes an ergonomically configured pistol grip distributor box 20 installed proximal the driver of a relevant vehicle. The pistol grip distributor box 20 is ergonomically configured for easy and comfortable grasping by the hand. The pistol grip distributor box 20 includes a cylindrical vertical portion 22, an angled portion 24, and a cylindrical horizontal portion 26.

The angled portion 24 is disposed atop the vertical portion 22, said angled portion 24 angled towards the front of a vehicle in which the pistol grip distributor box 20 is installed. The horizontal portion 26 is disposed endwise upon the angled portion 24, said horizontal portion 26 disposed to face the front of a vehicle in which the pistol grip distributor box 20 is installed. The vertical portion 22 is perpendicularly disposed with the horizontal portion 26.

A brake light trigger 28 is disposed underlying the horizontal portion 26, said brake light trigger 28 readily depressible by an index finger when the pistol grip distributor box 20 is grasped by a hand. A turn signal switch 30 is disposed atop the angled portion 24, said turn signal switch 30 readily operable with a thumb when the pistol grip distributor box 20 is grasped by a hand. A hazard light switch 32 is disposed upon one of two sides of the angled portion 24, said hazard light switch 32 readily operable by a thumb when the pistol grip distributor box 20 is grasped by a hand. A running lights switch 33 is disposed on the other of two sides of the angled portion 24.

A CPU 34 is disposed in operational communication with each of the brake light trigger 28, the turn signal switch 30, the hazard light switch 32, and the running lights switch 33. The CPU 34 causes the illumination of the trailer's brake lights when the brake light trigger 28 is depressed, the hazard lights when the hazard light switch 32 is activated, the trailer running lights when the running lights switch 33 is activated, and the relevant turn signal when the turn signal switch 30 is engaged in each of a first and alternately a second position.

To interconnect the device 10 with an extant power source, a first cord 36 is disposed connected to the pistol grip distributor box 20. The first cord 36 includes an automobile cigarette lighter adapter 38 disposed endwise thereupon, whereby the pistol grip distributor box 20 is interconnectable with an extant automobile cigarette lighter power outlet to directly power the extant trailer lighting system with which the device 10 is interconnected.

A second cord 40 is also connected to the pistol grip distributor box 20, said second cord 40 interconnectable directly with an extant trailer lighting circuit. To prevent damage to the CPU 34, or other regions of the circuit, and to protect a user from an electrical discharge, a replaceable fuse 42 is disposed in circuit between the CPU 34 and a relevant power source.

Thus, the present auxiliary trailer lighting and control device 10 may be powered directly from the relevant automobile in which said device is installed, whereby each of a trailer's brake lights, turn signals, and hazard lights are operable and controllable manually by a driver to override faulty or malfunctioning extant lighting circuits that have disabled the relevant lighting signals communicable though the automobile to the trailer, or for use with a towing vehicle that lacks a requisite trailer lighting interconnect.

What is claimed is:

1. An auxiliary trailer lighting and control device comprising:
   a pistol grip distributor box connectable to an extant automobile cigarette lighter power outlet and directly to an extant trailer lighting circuit, the pistol grip distributor box further comprising:
   a brake light trigger;
   a turn signal switch;
   a running lights switch;
   a hazard light switch;
   a cylindrical vertical portion;
   an angled portion disposed atop the vertical portion, said angled portion angled towards the front of a vehicle in which the pistol grip distributor is installed;
   a cylindrical horizontal portion disposed endwise upon the angled portion, said horizontal portion disposed to face the front of a vehicle in which the pistol grip is installed;
   wherein the vertical portion is perpendicularly disposed with the horizontal portion;
   wherein the pistol grip distributor box is ergonomically configured for grasping by the hand, the brake light trigger is disposed underlying the horizontal portion, the turn signal switch is disposed atop the angled portion, and the hazard light switch is disposed upon the side of the angled portion, whereby the brake light trigger is readily operable by an index finger, and the turn signal switch and the hazard light switch are readily operable by a thumb;
   wherein extant trailer lights are controllable manually to enable relevant traffic signals to other road users.

2. The auxiliary trailer lighting and control device of claim 1 further comprising a CPU disposed in the pistol grip distributor box, said CPU operationally controlling illumination of the relevant lights when each of the brake light trigger, turn signal switch, and hazard light switch is engaged.

3. The auxiliary trailer and control device of claim 2 further comprising a fuse replaceable within the circuit, said fuse disposed in circuit between a power source and the CPU.

4. The auxiliary trailer lighting and control device of claim 3 further comprising a first cord interconnectable with an extant automobile cigarette lighter power outlet.

5. The auxiliary trailer lighting and control device of claim 4 further comprising a second cord directly interconnectable with an extant trailer lighting circuit.

6. An auxiliary trailer lighting and control device comprising:
- an ergonomically configured pistol grip distributor box comprising:
  - a cylindrical vertical portion;
  - an angled portion disposed atop the vertical portion, said angled portion angled towards the front of a vehicle in which the pistol grip distributor box is installed;
  - a cylindrical horizontal portion disposed endwise upon the angled portion, said horizontal portion disposed to face the front of a vehicle in which the pistol grip distributor box is installed;
  - wherein the vertical portion is perpendicularly disposed with the horizontal portion;
  - a brake light trigger disposed underlying the horizontal portion, said brake light trigger readily depressible by an index finger when the pistol grip distributor box is grasped by a hand;
  - a turn signal switch disposed atop the angled portion, said turn signal switch readily operable with a thumb when the pistol grip distributor box is grasped by a hand;
  - a hazard light switch disposed upon one side of the angled portion, said hazard light switch readily operable by a thumb when the pistol grip distributor box is grasped by a hand;
  - a running lights switch disposed upon the other side of the angled portion;
- a CPU disposed in operational communication with each of the brake light trigger, the turn signal switch, the running lights switch, and the hazard light switch, said CPU illuminating relevant lights upon an extant trailer when each of said switches is operated manually;
- a first cord disposed to interconnect the pistol grip distributor box with an extant automobile cigarette lighter power outlet;
- a second cord directly interconnectable with an extant trailer lighting circuit; and
- a fuse disposed in circuit between the CPU and a relevant power source;
- wherein extant trailer lights are controllable manually by a driver of an automobile in the event of a failure of the extant primary trailer lighting circuit, or in a towing automobile that lacks a requisite trailer lighting interconnect, whereby traffic signals are manually communicable to other road users direct from the driver's seat.

\* \* \* \* \*